United States Patent
Koshirai et al.

(12)

(10) Patent No.: US 6,344,493 B2
(45) Date of Patent: *Feb. 5, 2002

(54) MELT TENSION IMPROVER FOR POLYOLEFIN RESINS AND PROCESS FOR PRODUCING THE SAME

(75) Inventors: Atsunori Koshirai; Akira Yanagase, both of Otake (JP)

(73) Assignee: Mitsubishi Rayon Co., Ltd., Tokyo (JP)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/463,996

(22) PCT Filed: Aug. 21, 1998

(86) PCT No.: PCT/JP98/03718

§ 371 Date: Feb. 22, 2000

§ 102(e) Date: Feb. 22, 2000

(87) PCT Pub. No.: WO99/10431

PCT Pub. Date: Mar. 4, 1999

(30) Foreign Application Priority Data

| Aug. 22, 1997 | (JP) | 9-226832 |
| Aug. 22, 1997 | (JP) | 9-226834 |
| Jan. 16, 1998 | (JP) | 10-6769 |
| Jan. 23, 1998 | (JP) | 10-11121 |
| Jan. 26, 1998 | (JP) | 10-124846 |

(51) Int. Cl.$^7$ .................... C08J 11/20; C08J 11/26; C08L 27/12; C08L 23/00; C08L 33/06
(52) U.S. Cl. .................. 521/42.5; 521/44.5; 525/192; 525/199
(58) Field of Search ............... 524/501; 525/192, 525/199; 523/342; 521/42.5, 44.5, 79

(56) References Cited

U.S. PATENT DOCUMENTS

| 2,681,324 A | * | 6/1954 | Hochberg | 524/501 |
| 5,116,711 A | * | 5/1992 | Kobayashi et al. | 430/106 |
| 5,256,512 A | * | 10/1993 | Kobayashi et al. | 430/106 |
| 5,344,876 A | * | 9/1994 | Piejko et al. | 525/199 |
| 5,922,468 A | * | 7/1999 | Huesmann et al. | 524/501 |
| 6,025,411 A | * | 2/2000 | Koshirai et al. | 525/199 |

FOREIGN PATENT DOCUMENTS

| JP | 7-324147 | 12/1995 |
| JP | 8-165358 | 6/1996 |

* cited by examiner

Primary Examiner—Peter Szekely
(74) Attorney, Agent, or Firm—Oblon, Spivak, McClelland, Maier & Neustadt, P.C.

(57) ABSTRACT

A melt tension enhancer for polyolefin resins that contains polytetrafluoroethylene and a polymer of an alkyl (meth) acrylate of 5–30 carbon atoms, and a process for its production. Its addition to polyolefin resins enhances the melt tension of the polyolefin resins without impairing the surface appearance of their molds.

13 Claims, No Drawings

MELT TENSION IMPROVER FOR POLYOLEFIN RESINS AND PROCESS FOR PRODUCING THE SAME

TECHNICAL FIELD

The present invention relates to a melt tension enhancer for polyolefin resins that contains (A) polytetrafluoroethylene and (B) a polymer based on an alkyl (meth)acrylate of 5–30 carbon atoms, and to a process for its production.

BACKGROUND ART

Polyolefin resins have been widely used in the past for a variety of molded products because of their low cost and excellent physical properties. However, because of low tension upon melting (hereunder referred to as "melt tension") in the case of polypropylene, for example, there are some disadvantages in terms of processability, including inferior vacuum moldability, blow moldability, foam moldability, extrusion moldability and calender moldability.

Polyethylene and the like are often blended with polypropylene toward the aim of improving these processability, but since the improvement in processability is insufficient, large amounts of polyethylene are required and this leads to the disadvantage of lower rigidity of the resulting blend. It has been attempted to raise the melt tension by increasing the molecular weight of the polyolefin, but higher molecular weight is a problem because it reduces the melt flow property which is one parameter of the processability, thus making it impossible to achieve a suitable balance between the melt tension and the melt flow property.

As a polyolefin resin with improved processability there has been disclosed polypropylene having a free-ended long-chain branched structure, in Japanese Unexamined Patent Publication No. 62-121704, Japanese Unexamined Patent Publication No. 2-298536 and elsewhere. The unique viscoelasticity of this polypropylene allows it to maintain the strength of resin films during foam molding, thus making it possible to produce foams with highly independent cells that have not been possible with conventional straight-chain polypropylene. However, because this type of polypropylene requires a special treatment method or synthesis method involving electron beam irradiation or peroxide addition in order to produce the free-ended long-chain branched structure, it has the disadvantage of greatly increased production costs for the resin.

On the other hand, metallocenes that work with methylaluminoxane as a co-catalyst have high uniformity in terms of activity compared to conventional catalysts, exhibit excellent copolymerization properties, and give polyethylene with a narrow molecular weight distribution and composition distribution at a high activity. Polyolefins obtained by metallocene catalysts have excellent heat seal properties and hot tackiness, but their narrow molecular weight distribution results in a low melt tension and they are hence known to have problems in terms of molding processability; an improvement in melt tension, therefore, is still desired.

Polytetrafluoroethylene has high crystallinity and low intermolecular force and therefore has the property of becoming fibrous under slight stress, while its combination with thermoplastic resins provides improved molding processability and mechanical properties, so that it has come to be used as an additive for thermoplastic resins.

For example, Japanese Unexamined Patent Publication No. 5-214184 and Japanese Unexamined Patent Publication No. 6-306212 disclose resin compositions comprising polyolefins added to polytetrafluoroethylene. Also, Japanese Unexamined Patent Publication No. 7-324147 discloses a process for production of a polyolefin resin composition obtained by mixing polytetrafluoroethylene and a dispersing medium powder under high shear, wherein a polyolefin is combined therewith after first rendering the polytetrafluoroethylene fibrous. In addition, Japanese Unexamined Patent Publication No. 9-25420 discloses a process that uses polytetrafluoroethylene encapsulated with styrene/acrylonitrile copolymer to improve the melting rate of various resins such as polyvinyl chloride resin.

However, polytetrafluoroethylene has the disadvantage of poor dispersability in common thermoplastic resins including no halogen atoms, and as taught in Japanese Unexamined Patent Publication No. 5-214184 and Japanese Unexamined Patent Publication No. 6-306212, it fails to uniformly disperse by simple blending and thus notably lowers the surface appearance of molded products.

Even with the process of Japanese Unexamined Patent Publication No. 7-324147, it is difficult to render all of the polytetrafluoroethylene fibrous by shear force, and the fibrous polytetrafluoroethylene therefore also aggregates in the matrix resin making it impossible to obtain a homogeneous composition.

Moreover, while the process of Japanese Unexamined Patent Publication No. 9-25420 attempts to improve affinity with the matrix resin by encapsulation, there is no effect of improved dispersability in polyolefin resins.

In other words, all of these processes leave the problem of dispersability of polytetrafluoroethylene in polyolefin resins, with the disadvantages of requiring large amounts of polytetrafluoroethylene to exhibit the useful properties mentioned above, and giving molded products with impaired surface appearance.

DISCLOSURE OF INVENTION

It is an object of the present invention to provide a melt tension enhancer that increases the dispersability of polytetrafluoroethylene in polyolefin resins and improves the molding processability of polyolefins without impairing the surface appearance of molded products.

As a result of diligent research aimed at overcoming the problems discussed above, the present inventors have completed the present invention upon finding that the melt tension of a polyolefin resin can be improved without impairing the surface appearance of molded products, by adding to the polyolefin resin a resin composition containing polytetrafluoroethylene and a polymer based on an alkyl (meth)acrylate of 5–30 carbon atoms.

The present invention therefore provides a melt tension enhancer for polyolefin resins comprising (A) polytetrafluoroethylene and (B) a polymer based on an alkyl (meth) acrylate of 5–30 carbon atoms, and to a process for its production.

BEST MODE FOR CARRYING OUT THE INVENTION

As examples of polyolefin resins to be used for the invention there may be mentioned resins wherein the main component is a homopolymer of an olefin monomer or a copolymer of olefin monomers obtained by radical polymerization, ion polymerization or the like, a copolymer of a dominant amount of an olefin monomer and a minor amount of a vinyl-based monomer, or a copolymer of an olefin monomer and a diene-based monomer, and any of these may be used alone or in combinations of two or more. The polymerization catalysts used for these resins may be known ones such as Ziegler catalysts, chromium catalysts or metallocene catalysts.

As the olefin monomer referred to here there may be mentioned ethylene, propylene, 1-butene, 1-hexene, 1-decene, 1-octene, 4-methyl-1-pentene and the like, among which ethylene and propylene are particularly preferred. As specific examples of homopolymers or copolymers of these olefinic monomers there may be mentioned low-density polyethylene, very low-density polyethylene, very very low-density polyethylene, linear low-density polyethylene, high-density polyethylene, ultrahigh molecular weight polyethylene, polypropylene, ethylene-propylene copolymer, polymethylpentene, polybutene and the like. These olefinic polymers may be used alone or in combinations of two or more. Particularly preferred among these are polyolefin resins whose main components are mixtures of one or more selected from the group consisting of polyethylene, polypropylene and ethylene-propylene copolymer.

The (A) polytetrafluoroethylene in the melt tension enhancer of the invention may be obtained by polymerization of a monomer component composed mainly of tetrafluoroethylene by a known process. The (A) polytetrafluoroethylene may contain, as copolymerized components, fluorine-containing olefins such as hexafluoropropylene, chlorotrifluoroethylene, fluoroalkylethylenes, perfluoroalkylvinyl ethers, etc. and fluorine-containing alkyl (meth) acrylates such as perfluoroalkyl (meth)acrylates, so long as the original properties of the polytetrafluoroethylene are not diminished. The content of copolymerized components is preferably no greater than 10 wt % based on the polytetrafluoroethylene.

The (B) polymer based on an alkyl (meth)acrylate of 5–30 carbon atoms in the melt tension enhancer of the invention may be obtained by polymerization of a monomer component comprising an alkyl (meth)acrylate of 5–30 carbon atoms by radical polymerization, ion polymerization or the like. As specific examples of alkyl (meth)acrylates of 5–30 carbon atoms there may be mentioned cyclohexyl (meth) acrylate, 2-ethylhexyl (meth)acrylate, nonyl (meth)acrylate, dodecyl (meth)acrylate, tridecyl (meth)acrylate, octadecyl (meth)acrylate and isobornyl (meth)acrylate. These monomers may be used alone or in combinations of two or more.

As monomers that are copolymerizable with the alkyl (meth)acrylate of 5–30 carbon atoms, there may be mentioned styrene-based monomers such as styrene, p-methylstyrene, o-methylstyrene, p-chlorstyrene, o-chlorstyrene, p-methoxystyrene, o-methoxystyrene, 2,4-dimethylstyrene and α-methylstyrene; alkyl (meth)acrylate monomers of 1–4 carbon atoms such as methyl (meth) acrylate, ethyl (meth)acrylate and butyl (meth)acrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate; olefin monomers such as ethylene, propylene and isobutylene; and diene monomers such as butadiene, isoprene, dimethylbutadiene, etc. These monomers may also be used alone or in combinations of two or more.

The melt tension enhancer of the invention contains the (A) polytetrafluoroethylene and (B) polymer based on an alkyl (meth)acrylate of 5–30 carbon atoms, where the weight ratio of (B)/(A) is preferably 0.2–100, and more preferably 0.5–50. If the weight ratio of (B)/(A) is less than 0.2 the dispersability of the polytetrafluoroethylene may be reduced. At greater than 100, the effect of the polytetrafluoroethylene may not be obtained.

The amount of the polytetrafluoroethylene in the melt tension enhancer of the invention is preferably 0.05–40 wt % based on the total weight of the melt tension enhancer. At less than 0.05 wt % it will have to be added in too large amount to achieve sufficient melt tension, and the rigidity and heat resistance of the polyolefin resin may be impaired. At greater than 40 wt % the dispersability of the polytetrafluoroethylene may be reduced.

By combining this melt tension enhancer in an amount such that the polytetrafluoroethylene content is 0.001–20 parts by weight per 100 parts by weight of the polyolefin resin, it is possible to obtain a polyolefin resin composition with satisfactory moldability, having the polytetrafluoroethylene component homogeneously dispersed in the polyolefin resin in a fine fibrillated state, and providing improved melt tension without impairing the surface appearance of molded products.

The melt tension enhancer of the invention can be obtained as a powder by a first process in which an aqueous dispersion of polytetrafluoroethylene particles with a particle size of 0.05–1.0 μm is combined with an aqueous dispersion of particles of a polymer based on an alkyl (meth)acrylate of 5–30 carbon atoms with a particle size of 0.05–1.0 μm, and the mixture is allowed to aggregate or spray-dried. It can also be obtained as a powder by a second process in which a monomer with an ethylenically unsaturated bond is polymerized in a dispersion containing a mixture of polytetrafluoroethylene particles with a particle size of 0.05–1.0 μm combined with an aqueous dispersion of particles of a polymer based on an alkyl (meth)acrylate of 5–30 carbon atoms with a particle size of 0.05–1.0 μm, and the product is then allowed to aggregate or spray-dried.

The aqueous dispersion of polytetrafluoroethylene particles used to produce the melt tension enhancer of the invention can be obtained by emulsion polymerization of a monomer component composed mainly of tetrafluoroethylene.

As representative commercially available starting materials for the polytetrafluoroethylene particle dispersion there may be mentioned Fluon AD-1 and AD-936 (trademarks) by Asahi ICI Fluoropolymers, Polyflon D-1 and D-2 (trademarks) by Daikin Industries, and Teflon 30J (trademark) by Mitsui-DuPont Fluorochemicals.

The aqueous dispersion of particles of the polymer based on an alkyl (meth)acrylate of 5–30 carbon atoms used to produce the melt tension enhancer of the invention may be obtained by polymerization of a monomer component comprising an alkyl (meth)acrylate of 5–30 carbon atoms by a known emulsion polymerization process or mini-emulsion polymerization process.

There are no particular restrictions on the ethylenically unsaturated bond-containing monomer that is further polymerized in the dispersion containing the mixture of the aqueous dispersion of polytetrafluoroethylene particles with a particle size of 0.05–1.0 μm combined with the aqueous dispersion of particles of a polymer based on an alkyl (meth)acrylate of 5–30 carbon atoms with a particle size of 0.05–1.0 μm, in the second production process for the melt tension enhancer of the invention, and it may be selected from among styrene-based monomers such as styrene, p-methylstyrene, o-methylstyrene, p-chlorstyrene, o-chlorstyrene, p-methoxystyrene, o-methoxystyrene, 2,4-dimethylstyrene and α-methylstyrene; (meth)acrylate monomers such as methyl (meth)acrylate, ethyl (meth) acrylate, butyl (meth)acrylate, 2-ethylhexyl (meth)acrylate, dodecyl (meth)acrylate, cyclohexyl (meth)acrylate, glycidyl (meth)acrylate and 2-hydroxyethyl (meth)acrylate; vinyl cyanide monomers such as acrylonitrile and methacrylonitrile; vinyl ether monomers such as vinyl methyl ether and vinyl ethyl ether; vinyl carboxylate monomers such as vinyl acetate and vinyl butyrate; olefin monomers such as ethylene, propylene and isobutylene; and diene monomers such as butadiene, isoprene, prene, dimethylbutadiene, etc. These monomers may also be used alone or in combinations of two or more.

The addition of the melt tension enhancer of the invention to the polyolefin resin may be accomplished by melt kneading by a known process such as extrusion kneading or roll kneading. Alternatively, it may be combined in a multistage process whereby the melt tension enhancer of the invention is combined with a portion of the polyolefin resin to prepare a master batch, after which the remainder of the polyolefin resin is added and mixed therewith.

The polyolefin resin composition containing the melt tension enhancer of the invention has increased tension when melted, improves the drawing properties upon calendering, the draw down of melted resins for thermoforming or blow molding, and the open cell formation upon foam molding, and improves the general processability for calendering, thermoforming, blow molding, foam molding and the like. It also improves the discharge volume for extrusion molding and the surface condition of extrusion molded articles such as sheets and films, as well as the extrusion processability. There is also no macro-aggregation of the polytetrafluoroethylene, so that the surface appearance of the molded products is excellent.

A filler may also be added to the polyolefin resin composition to which the melt tension enhancer of the invention has been added. The filler content is preferably 0.1–400 parts by weight per 100 parts by weight of the polyolefin resin composition, and inclusion of a filler can improve the rigidity and heat resistance, improve the processability such as the calenderability to prevent adhesion onto roll surfaces, and achieve cost reduction. At less than 0.1 part by weight the effect of improved rigidity may be insufficient, and at greater than 400 parts by weight the surface quality may be reduced. As representative fillers there may be mentioned calcium carbonate, talc, glass fiber, magnesium carbonate, mica, kaolin, calcium sulfate, barium sulfate, titanium white, white carbon, carbon black, ammonium hydroxide, magnesium hydroxide, aluminum hydroxide and the like. Preferred among these are calcium carbonate and talc.

If necessary, the polyolefin resin composition to which the melt tension enhancer has been added may further contain other additives such as a stabilizer, lubricant, flame retardant or the like. Representative examples of each that may be mentioned include, as stabilizers, phenolic stabilizers such as pentaerythrityl-tetrakis [3-(3,5-di-t-butyl-4-hydroxyphenyl)propionate] and triethyleneglycol-bis[3-(3-t-butyl-5-methyl-4-hydroxyphenyl)propionate], phosphorus-based stabilizers such as tris(monononylphenyl) phosphite and tris(2,4-di-t-butylphenyl) phosphite, and sulfur-based stabilizers such as dilaurylthiodipropionate; as lubricants, sodium, calcium or magnesium salt of lauric acid, palmitic acid, oleic acid or stearic acid; and as flame retardants, phosphoric acid ester compounds including trimethyl phosphate, triethyl phosphate, tributyl phosphate, trioctyl phosphate, tributoxyethyl phosphate, triphenyl phosphate, tricresyl phosphate, cresylphenyl phosphate, octyldiphenyl phosphate, diisopropylphenyl phosphate, tris (chloroethyl) phosphate, polyphosphates such as alkoxy-substituted bisphenol A bisphosphate, hydroquinone bisphosphate, resorcin bisphosphate and trioxybenzene triphosphate; tetrabromobisphenol A, decabromodiphenyl oxide, hexabromocyclododecane, octabromodiphenyl ether, bistribromophenoxyethane, ethylene bistetrabromophthalimide, tribromophenol, halogenated compounds including various halogenated epoxy oligomers obtained by reacting halogenated bisphenol A and epihalohydrin, carbonate oligomers with halogenated bisphenol A as a structural component, halogenated polystyrenes, chlorinated polyolefins and polyvinyl chloride, as well as metal hydroxides, metal oxides, sulfamine oxides, and the like.

The method of processing the polyolefin resin composition to which the melt tension enhancer of the invention has been added may be a method such as calendering, thermoforming, blow molding, foam molding, extrusion molding, injection molding or melt spinning.

The polyolefin resin composition to which the melt tension enhancer of the invention has been added can be used to obtain useful molded products including sheets, films, thermoforms, hollow molds, foams, extrusion molded products, fibers, and the like.

The present invention will now be explained in further detail by way of examples, with the understanding that the invention is in no way limited to these examples.

Through the following descriptions, "parts" and "%" are by weight.

The measurements of the different properties given in the Reference Examples, Examples and Comparative Examples were conducted as described below.

(1) Solid concentration: The particle dispersion was dried at 170° C. for 30 minutes.

(2) Particle size distribution and weight-average particle size: The particle dispersion was diluted with water as a sample solution, and measured by the dynamic light scattering method (ELS800 by Otsuka Denshi, KK. (trademark), temperature: 25° C., scattering angle: 90°).

(3) Zeta potential: The particle dispersion was diluted with a 0.01 mol/l NaCl aqueous solution as a sample solution, and measured by the electrophoresis method (ELS800 by Otsuka Denshi, KK., temperature: 25° C., scattering angle: 10°).

(4) Melt tension: A pellet of the polyolefin resin composition was extruded at a constant extrusion rate (10 mm falling speed/min) using a falling flow tester (Capillograph (trademark) by Toyo Seiki), the strand was pulled at a constant rate (4 m/min), and the melt tension was measured. The L/D of the die was 10.0 mm/$\phi$2.0 mm, and the measuring temperature was 200° C.

(5) Swelling ratio: A pellet of the resin composition was extruded at a constant extrusion rate (1.5 mm falling speed/min) using a falling flow tester (Capillograph by Toyo Seiki), the strand diameter (D) was measured at a position 5 mm under the nozzle, and calculation was made by the equation below. The L/D of the die was 10.0 mm/$\phi$2.0 mm, and the measuring temperature was 190° C. when polypropylene was included and 160° C. for polyethylene alone.

(Swelling ratio)=D (mm)/2.0

(6) Melt flow rate: A pellet of the resin composition was used for measurement with a 2.16 kg load according to ASTM D1238. The measuring temperature was 230° C. when polypropylene was included and 190° C. for polyethylene alone.

(7) Elastic modulus: A pellet of the resin composition was injection molded into a test piece which was measured according to ASTM D790.

(8) Roll sheet appearance: A pellet of the resin composition was used, and the outer appearance of a roll sheet during roll kneading was visually judged.

○: No irregularity of surface, excellent gloss.

Δ: Some irregularity of surface, slightly poor gloss

X: Considerable irregularity of surface, poor gloss (9) Draw down: A pellet of the resin composition was used for molding of a 100-mm square sheet with a thickness of 1.5 mm which was then anchored with a clamp having a 76-mm square opening, and the draw down of the sheet over 30 minutes was measured in an oven at 190° C.

(10) Evaluation of foam molded products: 1.0 part of azodicarbonamide (foaming agent) was added to 100 parts of a pellet of the resin composition, and injection molding was performed to create a foam molded product, upon which the condition of the cross-sectional cells was visually judged.

○: Fine and uniform

Δ: Somewhat non-uniform

X: Non-uniform

(11) Condition of foam sheets: The surface condition of the foam sheet and its cross-section were judged by observation.

○: No surface irregularities or continuous air bubbles, with an overall homogeneous condition.

X: Scaly irregularities or corrugations on the surface, or open cell structural sections, with no overall homogeneous condition.

(12) Calendering temperature range: A twin roll (calender roll) with a 15.24 cm diameter was used under conditions with a roll surface temperature in the range of 160–230° C., a roll speed of 10 m/min (roll speed ratio=1:1.1) and a roll spacing of 0.3 mm, for a procedure in which a 100 g sample was contacted onto the rolls for 5 minutes and a sheet was drawn out, and the temperature range giving a satisfactory sheet was determined.

(13) Calenderability property: The release property from the rolls and the surface quality were evaluated in the calendering of (12) above.

Release property

○: Released with no resistance

Δ: Released with resistance

X: Difficult to draw out sheet

Surface quality

○: No roughness

Δ: Fine roughness

X: Large roughness

(14) Bleeding property: The sheet obtained in (12) above was used to make a 1-mm thick press sheet, and after allowing it to stand for one week in a hot oven at 60° C., the degree of bleeding of the sheet surface was evaluated.

○: No bleeding

Δ: Some bleeding

X: Considerable bleeding

(15) Total light transmittance, haze and gloss (45° gloss) of sheets: These were measured by the method described for JIS K7105.

(16) Moldable temperature range for sheets: A sheet was molded (diameter: 10 mm, height: 6 mm) at a constant pressure using an air-pressure forming machine (FBP-M2 (trademark) by CKD Co.), and the ideal moldable temperature range giving a molded product with a uniform overall thickness was determined.

REFERENCE EXAMPLE 1

Production of poly(dodecyl methacrylate) Polymer Particle Dispersion (B-1)

In a mixed solution of 50 parts of dodecyl methacrylate and 50 parts of methyl methacrylate there was dissolved 0.1 part of 2,2'-azobis(2,4-dimethylvaleronitrile). To this there was then added a mixed solution containing 2.0 parts of sodium dodecylbenzenesulfonate and 300 parts of distilled water, and after stirring for 2 minutes at 10,000 rpm with a homomixer, it was passed twice through a homogenizer at 30 MPa pressure to obtain a stable preliminary dispersion. This was charged into a separable flask equipped with a stirring blade, condenser, thermocouple and nitrogen inlet, the internal temperature was raised to 80° C. under a nitrogen stream and the mixture was stirred for 3 hours for radical polymerization, to obtain a polymer particle dispersion (hereunder referred to as "B-1").

The solid concentration of B-1 was 25.1%, the particle size distribution exhibited a single peak, the weight-average particle size was 191 nm, and the surface potential was −58 mV.

REFERENCE EXAMPLE 2

Production of poly(dodecyl methacrylate) Polymer Particle Dispersion (B-2)

A polymer particle dispersion (hereunder referred to as "B-2") was obtained in the same manner as Reference Example 1, except that 50 parts of styrene was used instead of 50 parts of methyl methacrylate.

The solid concentration of B-2 was 25.2%, the particle size distribution exhibited a single peak, the weight-average particle size was 178 nm, and the surface potential was −61 mV.

REFERENCE EXAMPLE 3

Production of Polyolefin Resin Melt Tension Enhancer (C-1)

Fluon AD936 by Asahi ICI Fluoropolymers was used as the polytetrafluoroethylene particle dispersion. The solid concentration of Fluon AD936 is 63.0%, and it contains 5% polyoxyethylene alkylphenyl ether with respect to polytetrafluoroethylene. The particle size distribution of Fluon AD936 exhibited a single peak, the weight-average particle size was 290 nm and the surface potential was −20 mV.

Distilled water was added at 116.7 parts to 83.3 parts of Fluon AD936 to obtain polytetrafluoroethylene particle dispersion A-1 with a solid concentration of 26.2%. A-1 contained 25% polytetrafluoroethylene particles and 1.2% polyoxyethylene alkylphenyl ether.

After charging 120 parts of A-1 (30 parts of polytetrafluoroethylene) and 199.2 parts of B-1 (50 parts of dodecyl methacrylate/methyl methacrylate copolymer) into a separable flask equipped with a stirring blade, condenser, thermocouple and nitrogen inlet, the mixture was stirred for one hour at room temperature under a nitrogen stream. The internal temperature was then raised to 80° C., and after maintaining the temperature for one hour, a mixed solution of 0.001 part of iron (II) sulfate, 0.003 part of disodium ethylenediaminetetraacetate, 0.24 part of Rongalite salt and 60.8 parts of distilled water was added, and then a mixed solution of 20 parts of methyl methacrylate and 0.4 part of tert-butyl peroxide was added dropwise over one hour, and upon completion of the dropwise addition the internal temperature was kept at 80° C. for one hour to complete the radical polymerization. No separation of solids was seen during this procedure, and a homogeneous particle dispersion was obtained.

The particle dispersion was introduced into 400 parts of hot water at 90° C. containing 5 parts of calcium chloride to separate the solid portion, and upon filtration and drying there was obtained 98 parts of a powder of a polyolefin resin melt tension enhancer (hereunder referred to as "C-1").

The amounts of A-1, B-1 and dropwise polymerized methyl methacrylate used above are shown in Table 1.

REFERENCE EXAMPLES 4 AND 5

Production of Polyolefin Resin Melt Tension Enhancers (C-2 and C-3)

Polyolefin resin melt tension enhancers C-2 and C-3 were obtained in the same manner as Reference Example 3, except that the A-1, B-1 and dropwise polymerized methyl methacrylate were used in the amounts shown in Table 1.

TABLE 1

|  | A-1 amount (parts) | B-1 amount (parts) | MMA amount (parts) |
|---|---|---|---|
| C-1 | 120 | 199.2 | 20 |
| C-2 | 80 | 239.0 | 20 |
| C-3 | 40 | 278.9 | 20 |

REFERENCE EXAMPLE 6

Production of Polyolefin Resin Melt Tension Enhancer (C-4)

A powder of a polyolefin resin melt tension enhancer (hereunder referred to as "C-4") was obtained in the same manner as Reference Example 3, except that 198.4 parts of B-2 was used instead of 199.2 parts of B-1.

REFERENCE EXAMPLE 7

Production of Polyolefin Resin Melt Tension Enhancer (C-5)

After charging 120 parts of A-1 (30 parts of polytetrafluoroethylene) and 277.8 parts of B-2 (70 parts of dodecyl methacrylate/styrene copolymer) into a separable flask equipped with a stirring blade, condenser, thermocouple and nitrogen inlet, the mixture was stirred for one hour at room temperature under a nitrogen stream. The internal temperature was then raised to 80° C., and the temperature was maintained for one hour. No separation of solids was seen during this procedure, and a homogeneous particle dispersion was obtained.

The particle dispersion was introduced into 400 parts of hot water at 90° C. containing 5 parts of calcium chloride to separate the solid portion, and upon filtration and drying there was obtained 99 parts of a powder of a polyolefin resin melt tension enhancer (hereunder referred to as "C-5").

REFERENCE EXAMPLE 8

Production of Polyolefin Resin Melt Tension Enhancer (C-6)

After combining 50 parts of homopolypropylene (hereunder referred to as "PP-1") pellets with an MFR of 5.0 g/10 min with 50 parts of the melt tension enhancer C-2 obtained in Reference Example 4, a twin-screw extruder (ZSK30 (trademark) by WERNER & PFLEIDERER) was used for melt kneading at a barrel temperature of 200° C. and a screw rotation rate of 200 rpm, to obtain a melt tension enhancer (hereunder referred to as "C-6") in pellet form.

The compositions of the melt tension enhancers C-1 to C-6 obtained in Reference Examples 3–8 are listed in Table 2.

TABLE 2

| Melt tension enhancer | Composition (%) | | | |
|---|---|---|---|---|
|  | Component (A) | Monomers constituting component (B) | Monomer polymerized in presence of A, B | Polyolefin |
| C-1 | PTFE(30) | DMA(25)/MMA(25) | MMA(20) |  |
| C-2 | PTFE(20) | DMA(30)/MMA(30) | MMA(20) |  |
| C-3 | PTFE(10) | DMA(35)/MMA(35) | MMA(20) |  |
| C-4 | PTFE(30) | DMA(25)/ST(25) | MMA(20) |  |
| C-5 | PTFE(30) | DMA(35)/ST(35) |  |  |
| C-6 | PTFE(10) | DMA(15)/MMA(15) | MMA(10) | PP-1(50) |

PTFE: polytetrafluoroethylene
DMA: dodecyl methacrylate
MMA: methyl methacrylate
ST: styrene
PP-1: homopolypropylene with melt flow rate of 5.0 g/10 min.

EXAMPLES 1–8

The homopolypropylene pellets P-1 (melt flow rate: 5.0 g/10 min) were used as the polyolefin resin, and the melt tension enhancers C-1 to C-6 obtained in Reference Examples 3–8 were hand blended therewith in the proportions shown in Table 3, after which a twin-screw extruder (ZSK30 by WERNER & PFLEIDERER) was used for melt kneading at a barrel temperature of 200° C. and a screw rotation rate of 200 rpm, to form pellets. The properties of the resulting pellets were measured and the results are shown in Table 3.

COMPARATIVE EXAMPLES 1–4

For comparison, pellets obtained by extruding a polyolefin resin monomer under the same conditions as Example 1 (Comparative Example 1) and pellets obtained by combining powdered polytetrafluoroethylene with a powdered polyolefin, stirring the mixture at high speed with a Henschel mixer at room temperature, applying shear force during the mixing to render the polytetrafluoroethylene fibrous, and then extruding under the same conditions as Example 1 (Comparative Examples 2–4) were evaluated in the same manner as Example 1. The results are shown in Table 3.

Homopolypropylene pellets P-1 (Comparative Example 1) or powdered polypropylene P-2 (Comparative Examples 2–4) (both with a melt flow rate of 5.0 g/10 min) were used as the polyolefin resin, and Fluon CD123 by Asahi ICI Fluoropolymers was used as the powdered polytetrafluoroethylene. CD123 consists of polytetrafluoroethylene primary particles with a particle size of 0.2–0.3 $\mu$m, aggregated into aggregates of a few hundred $\mu$m size.

On the other hand, it was shown to result in less reduction in the melt flow rate, and no loss of extrusion moldability. The roll sheet appearance, draw down and foam moldability were also shown to be very excellent.

EXAMPLES 9–11

A mixture of the homopolypropylene pellets P-1 (melt flow rate: 5.0 g/10 min) and low-density polyethylene pellets E-1 (melt flow rate: 0.3 g/10 min) was used as the polyolefin, and the melt tension enhancer C-1 obtained in Reference Example 3 was hand blended therewith in the proportions shown in Table 4, after which pellets were formed in the same manner as Example 1. The properties of the resulting pellets were measured and the results are shown in Table 4.

COMPARATIVE EXAMPLES 6–11

Pellets obtained by extruding a mixture of the homopolypropylene pellets P-1 and low-density polyethylene pellets E-2 (Comparative Examples 6–8) and pellets

TABLE 3

|  |  | Composition (parts) | | PTFE in composition (%) | MT (g) | SR | MFR (g/10 min) | Elastic modulus (MPa) | Roll sheet appearance | Draw down (mm) | Foam molding product evaluation |
|---|---|---|---|---|---|---|---|---|---|---|---|
|  |  | Polyolefin resin | Melt tension enhancer |  |  |  |  |  |  |  |  |
| Example | 1 | P-1(100) | C-1(5) | 1.43 | 28 | 2.4 | 1.9 | 1370 | ○ | 0 | ○ |
|  | 2 | P-1(100) | C-1(3) | 0.87 | 19 | 2.1 | 3.2 | 1350 | ○ | 0 | ○ |
|  | 3 | P-1(100) | C-1(1) | 0.30 | 9 | 2.0 | 4.2 | 1350 | ○ | 2 | Δ |
|  | 4 | P-1(100) | C-2(4.5) | 0.86 | 19 | 2.1 | 3.1 | 1350 | ○ | 0 | ○ |
|  | 5 | P-1(100) | C-3(9.9) | 0.90 | 19 | 2.2 | 3.2 | 1350 | ○ | 0 | ○ |
|  | 6 | P-1(100) | C-4(3) | 0.87 | 19 | 2.2 | 3.1 | 1350 | ○ | 0 | ○ |
|  | 7 | P-1(100) | C-5(3) | 0.87 | 20 | 2.3 | 3.1 | 1350 | Δ | 0 | ○ |
|  | 8 | P-1(100) | C-6(9.9) | 0.90 | 18 | 2.2 | 3.3 | 1350 | ○ | 0 | ○ |
|  | 17 | P-1(100) | C-7(4.5) | 0.86 | 18 | 2.1 | 3.0 | 1350 | ○ | 0 | ○ |
| Comp. Ex. | 1 | P-1(100) | none | 0 | 3 | 1.3 | 5.0 | 1350 | ○ | 90 | x |
|  | 2 | P-2(100) | CD123(0.3) | 0.30 | 3 | 1.3 | 4.0 | 1350 | x | 62 | x |
|  | 3 | P-2(100) | CD123(0.9) | 0.89 | 4 | 1.3 | 3.5 | 1350 | x | 51 | x |
|  | 4 | P-2(100) | CD123(1.5) | 1.48 | 5 | 1.4 | 3.0 | 1350 | x | 41 | x |

P-1: homopolypropylene pellets (melt flow rate: 5.0 g/10 min)
P-2: powdered polypropylene (melt flow rate: 5.0 g/10 min)
CD123: powdered polytetrafluoroethylene (Fluon CD123 by Asahi ICI Fluoropolymers)
MT: melt tension
SR: swelling ratio
MFR: melt flow rate The composition containing the melt tension enhancer of the invention had notably higher values for melt tension and swelling ratio, as indicators of the drawing property for calendering, the thermoformability, the blow moldability and the foam moldability, as compared to the comparative examples containing the same amounts of PTFE, thus confirming that it provides satisfactory molding processability.

obtained by combining powdered polypropylene P-2, powdered low-density polyethylene E-2 (melt flow rate: 0.3 g/10 min) and powdered polytetrafluoroethylene, mixing with a Henschel mixer and then extruding (Comparative Examples 9–11) were evaluated in the same manner as Example 1. The results are shown in Table 4.

TABLE 4

|  |  | Composition (parts) | | PTFE in composition (%) | MT (g) | SR | MFR (g/10 min) | Elastic modulus (MPa) | Roll sheet appearance | Draw down (mm) | Foam molding product evaluation |
|---|---|---|---|---|---|---|---|---|---|---|---|
|  |  | Polyolefin resin | Melt tension enhancer |  |  |  |  |  |  |  |  |
| Example | 9 | P-1(100), E-1(20) | C-1(2.5) | 0.61 | 20 | 2.1 | 3.2 | 1200 | ○ | 0 | ○ |
|  | 10 | P-1(100), E-1(50) | C-1(3.1) | 0.61 | 26 | 2.2 | 3.4 | 900 | ○ | 0 | ○ |
|  | 11 | P-1(100), E-1(100) | C-1(4.2) | 0.62 | 39 | 2.3 | 3.5 | 700 | ○ | 0 | ○ |
| Comp. Ex. | 6 | P-1(100), E-1(20) | CD123(0.8) | 0 | 3 | 1.3 | 5.0 | 1200 | ○ | 40 | x |
|  | 7 | P-1(100), E-1(50) |  | 0 | 4 | 1.4 | 5.0 | 900 | ○ | 30 | x |
|  | 8 | P-1(100), E-1(100) |  | 0 | 6 | 1.5 | 5.0 | 700 | ○ | 30 | x |
|  | 9 | P-2(100), E-2(20) |  | 0.66 | 4 | 1.4 | 3.0 | 1200 | x | 20 | x |

TABLE 4-continued

| | Composition (parts) | | | | | | | Foam | |
|---|---|---|---|---|---|---|---|---|---|
| Polyolefin resin | Melt tension enhancer | PTFE in composition (%) | MT (g) | SR | MFR (g/10 min) | Elastic modulus (MPa) | Roll sheet appearance | Draw down (mm) | molding product evaluation |
| 10 P-2(100), E-2(50) | CD123(1.0) | 0.66 | 5 | 1.6 | 3.2 | 900 | x | 20 | x |
| 11 P-2(100), E-2(100) | CD123(1.3) | 0.65 | 8 | 1.6 | 3.3 | 700 | x | 10 | x |

P-1: homopolypropylene pellets (melt flow rate: 5.0 g/10 min)
P-2: powdered polypropylene (melt flow rate: 5.0 g/10 min)
E-1: low density polyethylene pellets (melt flow rate: 0.3 g/10 min)
E-2: powdered polyethylene (melt flow rate: 0.3 g/10 min)
CD123: powdered polytetrafluoroethylene
MT: melt tension
SR: swelling ratio
MFR: melt flow rate

EXAMPLES 12–13

After hand blending, in the proportions shown in Table 5, the homopolypropylene pellets P-1 (melt flow rate: 5.0 g/10 min), the low-density polyethylene pellets E-1 (melt flow rate: 0.3 g/10 min), the melt tension enhancer C-1 obtained in Reference Example 3 and light calcium carbonate with a particle size of 0.15 μm that had been surface treated with a fatty acid, pellets were formed in the same manner as Example 1. The properties of the resulting pellets were measured and the results are shown in Table 5.

COMPARATIVE EXAMPLES 12–15

Pellets obtained in the same manner as Example 1 by hand blending, in the proportions shown in Table 5, the homopolypropylene pellets P-1 (melt flow rate: 5.0 g/10 min), the low-density polyethylene pellets E-1 (melt flow rate: 0.3 g/10 min) and light calcium carbonate with a particle size of 0.15 μm that had been surface treated with a fatty acid (Comparative Examples 12–13), and pellets obtained by combining, in the proportions shown in Table 5, powdered polypropylene P-2, powdered low-density polyethylene E-2 (melt flow rate: 0.3 g/10 min), light calcium carbonate with a particle size of 0.15 μm that had been surface treated with a fatty acid and powdered polytetrafluoroethylene, mixing with a Henschel mixer and then extruding (Comparative Examples 14–15) were evaluated in the same manner as Example 1 to determine their properties, and the results are shown in Table 5.

TABLE 5

| | | Composition (parts) | | | | | | | | |
|---|---|---|---|---|---|---|---|---|---|---|
| | Polyolefin resin | Calcium carbonate | Melt tension enhancer | PTFE in composition (%) | MT (g) | SR | MFR (g/10 min) | Elastic modulus (MPa) | Roll sheet appearance | Draw down (mm) |
| Example | 12 P-1(100) | (50) | C-1(2.5) | 0.49 | 26 | 2.2 | 3.2 | 1600 | o | 0 |
| | 13 P-1(100), E-1(50) | (50) | C-1(3.3) | 0.49 | 28 | 2.3 | 3.3 | 1100 | o | 0 |
| Comp. Ex. | 12 P-1(100) | (50) | 0 | 0 | 4 | 1.3 | 5.0 | 1600 | o | 90 |
| | 13 P-1(100), E-1(50) | (50) | 0 | 0 | 4 | 1.4 | 5.0 | 1100 | o | 30 |
| | 14 P-2(100) | (50) | CD123(0.8) | 0.53 | 5 | 1.5 | 3.0 | 1600 | x | 30 |
| | 15 P-2(100), E-2(50) | (50) | CD123(1.0) | 0.50 | 5 | 1.6 | 3.2 | 1100 | x | 20 |

P-1: homopolypropylene pellets (melt flow rate: 5.0 g/10 min)
P-2: powdered polypropylene (melt flow rate: 5.0 g/1.0 min)
E-1: low density polyethylene pellets (melt flow rate: 0.3 g/10 min)
E-2: powdered polyethylene (melt flow rate: 0.3 g/10 min)
CD123: powdered polytetrafluoroethylene
Calcium carbonate: light calcium carbonate with particle size of 0.15 μm, surface treated with fatty acid
MT: melt tension
SR: swelling ratio
MFR: melt flow rate

EXAMPLES 14–16

The low-density polyethylene (LLDPE) pellets E-3 (melt flow rate: 2.6 g/10 min), polymerized with a metallocene catalyst, were used as the polyolefin resin, and the melt tension enhancer C-1 obtained in Reference Example 3 was hand blended therewith in the proportions shown in Table 6, after which a twin-screw extruder (ZSK30 by WERNER & PFLEIDERER) was used for melt kneading at a barrel temperature of 200° C. and a screw rotation rate of 200 rpm, to form pellets. The properties of the resulting pellets were measured and the results are shown in Table 6.

COMPARATIVE EXAMPLE 16

For comparison, pellets obtained by extruding E-3 monomer into pellets under the same conditions as Example 1 and then again extruding under the same conditions as Example 1 were evaluated in the same manner as Example 1. The results are shown in Table 6.

TABLE 6

|  | Polyolefin resin | Composition (parts) Melt tension enhancer | PTFE in composition (%) | MT (g) | SR | MFR (g/10 min) | Roll sheet appearance |
|---|---|---|---|---|---|---|---|
| Example | 14 E-3(100) | C-1(5) | 1.43 | 2 | 2.3 | 1.2 | ○ |
|  | 15 E-3(100) | C-1(3) | 0.87 | 17 | 2.1 | 1.7 | ○ |
|  | 16 E-3(100) | C-1(1) | 0.30 | 8 | 2.0 | 1.9 | ○ |
| Comp. Ex. | 16 E-3(100) | none | 0 | 2 | 1.3 | 2.0 | ○ |

E-3: low-density polyethylene pellets synthesized with metallocene catalyst (MFR 2.0 g/10 min)
MT: melt tension
SR: swelling ratio
MFR: melt flow rate

REFERENCE EXAMPLE 9

Production of Polyolefin Resin Melt Tension Enhancer (C-7)

After charging 0.6 part of sodium dodecylbenzenesulfonate and 115 parts of distilled water into a separable flask equipped with a stirring blade, condenser, thermocouple and nitrogen inlet, the temperature was raised to 80° C. under a nitrogen stream. A mixed solution of 0.00024 part iron (II) sulfate, 0.00072 part disodium ethylenediaminetetraacetate, 0.29 part Rongalite salt and 5 parts distilled water was then added while mixing and the internal temperature was raised to 80° C., after which a mixed solution of 42 parts of 2-ethylhexyl methacrylate, 18 parts of methyl methacrylate and 0.12 part of cumene hydroperoxide was added dropwise over 3 hours to promote radical polymerization. After completion of the dropwise addition, the internal temperature was kept at 80° C. for one hour, after which 33.33 parts of AD936 (20 parts of polytetrafluoroethylene) and 51.37 parts of distilled water were added in that order, and the internal temperature was kept at 80° C. for one hour. Next, a mixed solution of one part dodecylbenzenesulfonic acid and 13 parts distilled water was added, the internal temperature was brought to 80° C., a mixed solution of 20 parts methyl methacrylate and 0.04 part tert-butyl peroxide was added dropwise over 30 minutes, and after the dropwise addition was completed the temperature was kept at 80° C. for one hour to complete the radical polymerization. No separation of solids was seen during this procedure, and a homogeneous particle dispersion was obtained. The particle dispersion was introduced into 400 parts of hot water at 90° C. containing 5 parts of calcium chloride to separate the solid portion, and upon filtration and drying there was obtained 98 parts of a powder of a polyolefin resin melt tension enhancer (hereunder referred to as "C-7").

EXAMPLE 17

The effect of adding C-7 in the same manner as Example 4 was evaluated, using C-7 instead of C-2. The results are shown in Table 3.

The composition containing the melt tension enhancer of the invention had notably higher values for melt tension and swelling ratio, as indicators of the drawing property for calendering, the thermoformability, the blow moldability and the foam moldability, thus confirming that it provides satisfactory molding processability. On the other hand, it was shown to result in less reduction in the melt flow rate, and no loss of extrusion moldability. The roll sheet appearance was also shown to be very excellent.

EXAMPLE 18

The homopolypropylene pellets EA9 (trademark, melt flow rate: 0.5 g/10 min) manufactured by Nihon Polychem, KK. were used as the polyolefin resin, and the melt tension, swelling ratio, melt flow rate, elastic modulus and roll sheet appearance were evaluated, giving the results shown in Table 7 as the "unused sample". After hand blending 0.2 part of the melt tension enhancer C-1 obtained in Reference Example 3 added to 100 parts by weight of a crushed test piece obtained by press molding the unused sample, a twin-screw extruder (ZSK30 by WERNER & PFLEIDERER) was used for melt kneading at a barrel temperature of 200° C. and a screw rotation rate of 200 rpm, to form pellets. The resulting pellets were designated as regenerated product a1. The properties of this regenerated product a1 were evaluated. Next, 0.2 part of the melt tension enhancer C-1 obtained in Reference Example 3 was added to 100 parts by weight of a crushed test piece obtained by press molding the regenerated product a1, and pellets of a regenerated product a2 were obtained in the same manner as the regenerated product a1. The properties of this regenerated product a2 were evaluated. Pellets of a regenerated product a3 were obtained from the regenerated product a2 in the same manner, and its properties were evaluated. The results of evaluating the regenerated products a1–a3 were shown in Table 7.

TABLE 7

|  | MT (g) | SR | MFR | Elastic modulus (MPa) | Roll sheet appearance |
|---|---|---|---|---|---|
| Unused sample | 14 | 1.3 | 0.5 | 1300 | ○ |
| Regenerated sample a1 | 14 | 1.3 | 0.5 | 1300 | ○ |
| Regenerated sample a2 | 14 | 1.3 | 0.5 | 1300 | ○ |
| Regenerated sample a3 | 14 | 1.3 | 0.5 | 1300 | ○ |

COMPARATIVE EXAMPLE 17

For comparison, pellets of regenerated products b1–b3 were obtained in the same manner as Example 18 without adding the melt tension enhancer C-1, and their properties were evaluated. The results are shown in Table 8.

TABLE 8

|  | MT (g) | SR | MFR | Elastic modulus (MPa) | Roll sheet appearance |
|---|---|---|---|---|---|
| Regenerated sample b1 | 12 | 1.3 | 0.6 | 1300 | ○ |

TABLE 8-continued

| | MT (g) | SR | MFR | Elastic modulus (MPa) | Roll sheet appearance |
|---|---|---|---|---|---|
| Regenerated sample b2 | 9 | 1.2 | 0.7 | 1300 | ○ |
| Regenerated sample b3 | 7 | 1.2 | 0.8 | 1300 | ○ |

COMPARATIVE EXAMPLE 18

For comparison, pellets of regenerated products c1–c3 were obtained in the same manner as Example 1 using 0.2 part of powdered polytetrafluoroethylene instead of the melt tension enhancer C-1 of the invention. The results of evaluating their properties are shown in Table 9. Here, Fluon CD123 (trademark) by Asahi ICI Fluoropolymers was used as the powdered polytetrafluoroethylene.

TABLE 9

| | MT (g) | SR | MFR | Elastic modulus (MPa) | Roll sheet appearance |
|---|---|---|---|---|---|
| Regenerated sample c1 | 11 | 1.3 | 0.6 | 1300 | x |
| Regenerated sample c2 | 10 | 1.2 | 0.7 | 1300 | x |
| Regenerated sample c3 | 8 | 1.2 | 0.7 | 1300 | x |

In Tables 7–9,
MT: melt tension, SR: swelling ratio, MFR: melt flow rate

The compositions containing the melt tension enhancer of the invention exhibited absolutely no property changes, typical of which is reduced melt tension upon regeneration, and were confirmed to have a satisfactory drawing property for calenderability, thermoformability, blow moldability and foam molability, similar to the unused product. The appearance of the compositions was also confirmed to be satisfactory.

REFERENCE EXAMPLE 10

Production of Polyolefin Resin Melt Tension Enhancer (C-8)

2,2'-azobis(2,4-dimethylvaleronitrile) was dissolved at 0.1 part in 100 parts of dodecyl methacrylate. After then adding a mixture of 2.0 parts of sodium dodecylbenzenesulfonate and 300 parts of distilled water and stirring for 2 minutes with a homomixer at 10,000 rpm, it was passed twice through a homogenizer at 30 MPa pressure to obtain a stable preliminary dispersion of dodecyl methacrylate. This was charged into a separable flask equipped with a stirring blade, condenser, thermocouple and nitrogen inlet, the internal temperature was raised to 80° C. under a nitrogen stream and the mixture was stirred for 3 hours with the internal temperature raised to 80° C. under a nitrogen stream, for radical polymerization to obtain a polymer particle dispersion of dodecyl methacrylate (hereunder referred to as "B-3").

The solid concentration of B-3 was 25.2%, the particle size distribution exhibited a single peak, the weight-average particle size was 195 nm, and the surface potential was –38 mV.

After charging 80 parts of the A-1 obtained in Reference Example 3 (20 parts of polytetrafluoroethylene) and 198.4 parts of B-3 (50 parts of poly(dodecyl methacrylate)) in a separable flask equipped with a stirring blade, condenser, thermocouple, nitrogen inlet and dropping funnel, the mixture was stirred for one hour at room temperature under a nitrogen stream. The internal temperature was then raised to 80° C., and after adding a mixed solution of 0.001 part of iron (II) sulfate, 0.003 part of disodium ethylenediaminetetraacetate, 0.24 part of Rongalite salt and 10 parts of distilled water, a mixed solution of 30 parts of methyl methacrylate and 0.6 part of tert-butyl peroxide was added dropwise over one hour, and upon completion of the dropwise addition the internal temperature was kept at 80° C. for one hour to complete the radical polymerization. No separation of solids was seen during this procedure, and a homogeneous particle dispersion was obtained. The solid concentration of the particle dispersion was 31.3%, the particle size distribution was relatively broad, and the weight-average particle size was 252 nm.

A 319.5 part portion of this particle dispersion was loaded into 600 parts of hot water at 70° C. containing 5 parts of calcium chloride to separate the solid portion, and upon filtration and drying there was obtained 99 parts of a polyolefin resin melt tension enhancer (C-8).

The dried C-8 was formed into a strip shape at 220° C. using a press molding machine, and then an ultrathin strip prepared therefrom using a microtome was observed under a transmission electron microscope without dyeing. Polytetrafluoroethylene was observed as dark portions, but no aggregates exceeding 10 µm were observed.

EXAMPLES 19–21

Comparative Examples 19–21

Linear homopolypropylene pellets (melt flow rate: 5.0 g/10 min) were used as the polyolefin resin, and the polyolefin resin melt tension enhancer obtained in Reference Example 10 (C-8), a foaming agent (isobutane) and an air bubble adjustor (talc) were combined therewith in an extruder (screw diameter: 50 mm, L/D=46) in the proportions shown in Table 10 for melt kneading, after which the mixture was extruded and foamed into a tube shape at the foaming temperature shown in Table 10 using a circular die with a 75 mmφ (die diameter) and a 0.3 mm gap (lip clearance) mounted on the end of the extruder, while being drawn out so that the inner surface of the tube-shaped foam contacted with a cooling mandrel (mandrel diameter: 200 mm), and then the tube-shaped foam was cut open in the direction of extrusion to obtain a sheet. The extrusion conditions and conditions of each of the obtained foam sheets are shown together in Table 10.

For comparison, a mold extruded without adding the polytetrafluoroethylene-containing mixture powder (Comparative Example 19), a mold with polytetrafluoroethylene fine powder added (Fluon CD123 by Asahi ICI Fluoropolymers) (Comparative Example 20) and a mold with only the air bubble adjustor added (Comparative Example 21) were evaluated in the same manner. The results are shown in Table 10.

TABLE 10

| | | Mixing proportions (%) | | | | | Evaluation of foamed sheets | | |
|---|---|---|---|---|---|---|---|---|---|
| | | PP | C-8 | CD123 | Foaming agent | Air bubble adjustor | Foaming temperature (° C.) | Density (g/cm³) | Thickness (mm) | Condition |
| Example | 19 | 85 | 5 | 0 | 10 | 0 | 156 | 0.058 | 1.7 | ○ |
| | 20 | 90 | 5 | 0 | 5 | 0 | 157 | 0.098 | 1.5 | ○ |
| | 21 | 84.9 | 5 | 0 | 10 | 0.1 | 156 | 0.056 | 1.6 | ○ |
| Comp. Ex. | 19 | 90 | 0 | 0 | 10 | 0 | 157 | 0.062 | 1.7 | x |
| | 20 | 88 | 0 | 2 | 10 | 0 | 157 | 0.060 | 1.7 | x |
| | 21 | 89.9 | 0 | 0 | 10 | 0.1 | 158 | 0.061 | 1.5 | x |

PP: homopolypropylene pellets (melt flow rate 0.5 g/min)
CD123: polytetrafluoroethylene fine powder (Fluon CD123 by Asahi ICI Fluoropolymers)

REFERENCE EXAMPLE 11

Production of Polyolefin Resin Melt Tension Enhancer (C-9)

In a mixed solution of 75 parts of dodecyl methacrylate and 25 parts of methyl methacrylate there was dissolved 0.1 part of 2,2'-azobis(2,4-dimethylvaleronitrile). To this there was then added a mixed solution containing 2.0 parts of sodium dodecylbenzenesulfonate and 300 parts of distilled water, and after stirring for 4 minutes at 10,000 rpm with a homomixer, it was passed twice through a homogenizer at 30 MPa pressure to obtain a stable dodecyl methacrylate/methyl methacrylate preliminary dispersion. This was charged into a separable flask equipped with a stirring blade, condenser, thermocouple and nitrogen inlet, the internal temperature was raised to 80° C. under a nitrogen stream and the mixture was stirred for 3 hours for radical polymerization, to obtain a dodecyl methacrylate/methyl methacrylate copolymer particle dispersion (hereunder referred to as "B-4").

The solid concentration of B-4 was 25.1%, the particle size distribution exhibited a single peak, the weight-average particle size was 198 nm, and the surface potential was −39 mV.

After charging 160 parts of the A-1 obtained in Reference Example 3 (40 parts of polytetrafluoroethylene) and 159.4 parts of B-4 (40 parts of dodecyl methacrylate/methyl methacrylate copolymer) in a separable flask equipped with a stirring blade, condenser, thermocouple, nitrogen inlet and dropping funnel, the mixture was stirred for one hour at room temperature under a nitrogen stream. The internal temperature was then raised to 80° C., and after adding a mixed solution of 0.001 part of iron (II) sulfate, 0.003 part of disodium ethylenediaminetetraacetate, 0.24 part of Rongalite salt and 10 parts of distilled water, a mixed solution of 20 parts of methyl methacrylate and 0.1 part of tert-butyl peroxide was added dropwise over 30 minutes, and upon completion of the dropwise addition the internal temperature was kept at 80° C. for one hour to complete the radical polymerization. No separation of solids was seen during this procedure, and a homogeneous particle dispersion was obtained. The solid concentration of the particle dispersion was 28.5%, the particle size distribution was relatively broad, and the weight-average particle size was 248 nm.

A 349.7 part portion of this particle dispersion was loaded into 600 parts of hot water at 75° C. containing 5 parts of calcium chloride to separate the solid portion, and upon filtration and drying there was obtained 97 parts of a polyolefin resin melt tension enhancer (C-9).

The dried C-9 was formed into a strip shape at 220° C. using a press molding machine, and then an ultrathin strip prepared therefrom using a microtome was observed under a transmission electron microscope without dyeing. Polytetrafluoroethylene was observed as dark portions, but no aggregates exceeding 10 μm were observed.

EXAMPLE 22

Comparative Examples 22–26

The C-9 obtained in Reference Example 11 was mixed with 100 parts of linear homopolypropylene pellets (EA9 by Nihon Polychem, melt flow rate: 0.5 g/10 min) in the proportion shown in Table 12, and the mixture was extruded with an extruder at 230° C. to prepare pellets. The pellets were used for calender molding, and the calender molding temperature range, calender molding property and sheet bleeding were evaluated. The results are shown in Table 12.

For comparison, a mold extruded without adding the polytetrafluoroethylene-containing mixture powder (Comparative Example 22), a mold with polytetrafluoroethylene fine powder added (Fluon CD123 by Asahi ICI Fluoropolymers) (Comparative Examples 23, 24), a mold with glass beads added (GB731MC (trademark) by Toshiba Ballotini) (Comparative Example 25) and a mold with metallic soap added (lithium stearate) (Comparative Example 26) were evaluated in the same manner. The results are shown in Table 12.

EXAMPLES 23–28

Pellets were prepared in the same manner as Example 22, except that 100 parts of each of the resins shown in Table 11 was used instead of 100 parts of the linear homopolypropylene pellets (EA9 by Nippon Polychem, melt flow rate: 0.5 g/10 min), and these were evaluated in the same manner. The results are shown in Table 12.

TABLE 11

| | | Resin used | MFR (g/10 min) | Product |
|---|---|---|---|---|
| Example | 23 | Propylene.ethylene block copolymer | 0.5 | EA9, Nippon Polychem |
| | 24 | Above resin containing 30% talc | 0.1 | EA9/talc |
| | 25 | Propylene.ethylene random copolymer | 3.0 | SPX9600 (trademark), Nippon Polychem |
| | 26 | High density polyethylene | 0.3 | HDBZ50U (trademark), Nippon Polychem |
| | 27 | Low density polyethylene | 8.0 | LC602A (trademark), Nippon Polychem |
| | 28 | Ethylene-vinyl acetate copolymer | 15 | LV670 (trademark), Nippon Polychem |

TABLE 12

| | | | Additive | | Calendering temperature | Calenderability | | |
|---|---|---|---|---|---|---|---|---|
| | | Resin | Type | Amount (parts) | range (° C.) | Release property | Surface qulaity | Bleeding |
| Example | 22 | EA9 | C-9 | 0.25 | 22 | ○ | ○ | ○ |
| Comp. Ex. | 22 | EA9 | | | 2 | x | ○ | ○ |
| | 23 | EA9 | CD123 | 0.1 | 3 | x | x | ○ |
| | 24 | EA9 | CD123 | 1.0 | 3 | Δ | x | ○ |
| | 25 | EA9 | glass beads | 1.0 | 9 | Δ | x | ○ |
| | 26 | EA9 | metallic soap | 1.0 | 2 | ○ | ○ | Δ |
| Example | 23 | EC9 | C-9 | 0.25 | 23 | ○ | ○ | ○ |
| | 24 | EC9/talc | C-9 | 0.25 | 23 | ○ | ○ | ○ |
| | 25 | SPX9600 | C-9 | 0.25 | 22 | ○ | ○ | ○ |
| | 26 | HDBZ50U | C-9 | 0.25 | 21 | ○ | ○ | ○ |
| | 27 | LC602A | C-9 | 0.25 | 26 | ○ | ○ | ○ |
| | 28 | LV670 | C-9 | 0.25 | 19 | ○ | ○ | ○ |

EXAMPLE 29

Linear homopolypropylene pellets (EA7 (trademark) by Nippon Polychem, melt flow rate: 1.2 g/10 min) were combined with the C-9 obtained in Reference Example 11 in the proportion shown in Table 13, and the mixture was kneaded with a T die-mounted single-screw extruder (screw diameter: 50 mm, L/D=28) at 230° C., 50 rpm, and extruded to obtain a thermoforming polyolefin sheet with a thickness of 0.3 mm. The total light transmittance, haze, gloss and moldable temperature range of the obtained sheet were evaluated and the results are shown in Table 13.

For comparison, a mold extruded without adding the C-9 (Comparative Example 27) and a mold with polytetrafluoroethylene fine powder added (Fluon CD123 by Asahi ICI Fluoropolymers) (Comparative Examples 28, 29) were evaluated in the same manner. The results are shown in Table 13.

TABLE 13

| Composition | Example | Comp. Ex. | | |
|---|---|---|---|---|
| (parts by weight) | 29 | 27 | 28 | 29 |
| PP | 100 | 100 | 100 | 100 |
| C-9 | 0.25 | | | |
| CD123 | | | 0.1 | 1.0 |
| Total light transmittance | 90 | 88 | 86 | 71 |
| Haze (%) | 22 | 26 | 40 | 42 |
| Gloss (%) | 100 | 100 | 65 | 59 |
| Moldable temperature range (° C.) | 18 | 2 | 3 | 3 |

EXAMPLE 30

Comparative Examples 30–32

Linear homopolypropylene pellets (EA7 by Nippon Polychem, melt flow rate: 1.2 g/10 min), talc and the C-9 obtained in Reference Example 11 were combined in the proportion shown in Table 14, and a twin-screw extruder (ZSK30 by WERNER & PFLEIDERER) was used for melt kneading at a barrel temperature of 200° C. and a screw rotation rate of 200 rpm, to form pellets. The obtained pellets were kneaded with a T die-mounted single-screw extruder (screw diameter: 50 mm, L/D=28) at 230° C., 50 rpm, and extruded to obtain a thermoforming polyolefin sheet with a thickness of 0.3 mm. The gloss and moldable temperature range of the obtained sheet were evaluated and the results are shown in Table 14.

For comparison, a mold extruded without adding the polytetrafluoroethylene-containing mixture powder (Comparative Example 30) and a mold with polytetrafluoroethylene fine powder added (Fluon CD123 by Asahi ICI Fluoropolymers) (Comparative Examples 31, 32) were evaluated in the same manner. The results are shown in Table 14.

TABLE 14

| Composition | Example | Comp. Ex. | | |
|---|---|---|---|---|
| (parts by weight) | 30 | 30 | 31 | 32 |
| PP | 100 | 100 | 100 | 100 |
| Talc | 30 | 30 | 30 | 30 |

TABLE 14-continued

| Composition | Example | Comp. Ex. | | |
|---|---|---|---|---|
| (parts by weight) | 30 | 30 | 31 | 32 |
| C-9 | 0.25 | | | |
| CD123 | 0 | | 0.1 | 1.0 |
| Gloss (%) | 88 | 89 | 43 | 37 |
| Moldable temperature range (° C.) | 20 | 2 | 3 | 3 |

Industrial Applicability

The melt tension enhancer of the present invention has very satisfactory dispersability in polyolefin resins, and polyolefin resin compositions containing it exhibit high tension when melted and molding processability such as excellent drawing property for calendering, thermoformability, blow moldability, foam molding properties and the like. A composition containing the melt tension enhancer of the invention can be used to give sheet and film extrusion molded articles with improved surface conditions and satisfactory extrusion processability. When a filler is included, the sheets and films have improved surface conditions when subjected to calendering and extrusion, while also exhibiting excellent rigidity.

Furthermore, by adding the melt tension enhancer of the invention for regeneration of polyolefin resin waste, it is possible to avoid tension reduction upon melting and maintain satisfactory molding processability, including drawing property for calendering, thermoformability, blow moldability, foam moldability, etc. Its very high dispersability in polyolefin resins also gives regenerated products with a satisfactory surface appearance.

The melt tension enhancer of the invention is therefore highly useful for production of polyolefin resin molded products.

What is claimed is:

1. A recycling process for polyolefin resin products, comprising:
   chopping or crushing polyolefin resin product waste;
   adding a melt tension enhancer for polyolefin resins comprising:
   (A) polytetrafluoroethylene and (B) a polymer of an alkyl (meth)acrylate of 5–30 carbon atoms to the chopped or crushed polyolefin resin product waste in an amount such that the (A) polytetrafluoroethylene content is 0.001–20 parts by weight per 100 parts by weight of the polyolefin resin in said polyolefin resin product waste; and
   hot melt molding to produce a recycled polyolefin resin product.

2. The process according to claim 1, wherein said melt tension enhancer for polyolefin resins further comprises (C) a polyolefin resin.

3. The process according to claim 1, wherein said (A) polytetrafluoroethylene is polytetrafluoroethylene alone or a copolymer of tetrafluoroethylene and at least one comonomer selected from the group consisting of hexafluoropropylene, chlorotrifluoroethylene, fluoroalkylethylene, perfluoroalkylvinyl ether, and perfluoroalkyl(meth)acrylate.

4. The process according to claim 3, wherein when said polytetrafluoroethylene is a copolymer, said comonomer is present in an amount no greater than 10% by weight based on the total weight of said polytetrafluoroethylene.

5. The process according to claim 1, wherein said alkyl (meth)acrylate of 5–30 carbon atoms in said polymer (B) is selected from the group consisting of cyclohexyl(meth) acrylate, 2-ethylhexyl(meth)acrylate, nonyl(meth)acrylate, dodecyl(meth)acrylate, tridecyl(meth)acrylate, octadecyl (meth)acrylate, isobornyl(meth)acrylate, and combinations thereof.

6. The process according to claim 1, wherein said (B) polymer of an alkyl(meth)acrylate of 5–30 carbon atoms is a copolymer of alkyl(meth)acrylate of 5–30 carbon atoms and at least one comonomer selected from the group consisting of styrene, p-methylstyrene, o-methylstyrene, p-chlorostyrene, o-chlorostyrene, p-methoxystyrene, o-methoxystyrene, 2,4-dimethylstyrene, α-methylstyrene, methyl(meth)acrylate, ethyl(meth)acrylate, butyl(meth) acrylate, acrylonitrile, methacrylonitrile, vinyl methyl ether, vinyl ethyl ether, vinyl acetate, vinyl butyrate, ethylene, propylene, isobutylene, butadiene, isoprene, dimethylbutadiene, and combinations thereof.

7. The process according to claim 1, wherein a weight ration of said (B)/(A) is 0.2–100.

8. The process according to claim 1, wherein a weight ration of said (B)/(A) is 0.5–50.

9. The process according to claim 1, wherein said (A) polytetrafluoroethylene is present in an amount of 0.05–40% by weight based on the total weight of the melt tension enhancer.

10. The process according to claim 1, further comprising:
    prior to said hot melt molding, adding a filler to the polyolefin resin product waste to which said melt tension enhancer has been added.

11. The process according to claim 1, further comprising:
    prior to said hot melt molding, adding at least one additive to said polyolefin resin product to which said melt tension enhancer has been added.

12. The process according to claim 1, wherein said hot melt molding comprises calendering, thermoforming, blow molding, foam molding, extrusion molding, injection molding, and melt spinning.

13. The process according to claim 1, wherein said recycled polyolefin resin product is selected from the group consisting of a sheet, film, thermoform, hollow mold, foam, extrusion molded product, and fiber.

* * * * *

UNITED STATES PATENT AND TRADEMARK OFFICE
CERTIFICATE OF CORRECTION

PATENT NO. : 6,344,493 B2
DATED : February 5, 2002
INVENTOR(S) : Atsunori Koshirai et al.

It is certified that error appears in the above-identified patent and that said Letters Patent is hereby corrected as shown below:

<u>Title page,</u>
Item [30], "Jan. 26, 1998 (JP) ............. 10-124846" should read
-- Jan. 26, 1998 (JP) .......... 10-12846 --.

Signed and Sealed this

First Day of October, 2002

Attest:

Attesting Officer

JAMES E. ROGAN
Director of the United States Patent and Trademark Office